United States Patent

Yoshino et al.

[15] 3,668,147
[45] June 6, 1972

[54] MULTIPLE PROMOTED IRON OXIDE-ANTIMONY OXIDE CATALYSTS FOR OXIDATION OF OLEFINS

[72] Inventors: Takachika Yoshino, Yokohama; Shigeru Saito, Fuchu-shi; Jun Ishikura; Yutaka Sasaki, both of Yokohama; Masukuni Sobukawa, Tokyo, all of Japan

[73] Assignee: Nitto Chemical Industry Co., Ltd., Tokyo, Japan

[22] Filed: Nov. 19, 1968

[21] Appl. No.: 777,104

[30] Foreign Application Priority Data

Nov. 28, 1967 Japan................42/75890
Sept. 20, 1968 Japan................43/67578
Sept. 20, 1968 Japan................43/67580
Sept. 20, 1968 Japan................43/67579

[52] U.S. Cl..................252/432, 252/435, 252/437, 252/439
[51] Int. Cl. ..........................B01j 11/82
[58] Field of Search ..........252/432, 435, 437, 439; 260/465.3

[56] References Cited

UNITED STATES PATENTS

| | | | |
|---|---|---|---|
| 3,426,060 | 2/1969 | Eden | 260/465.3 |
| 3,392,189 | 7/1968 | Eden | 260/465.3 |
| 3,232,978 | 2/1966 | Yasuhara | 260/465.3 |
| 2,904,580 | 9/1959 | Idol | 260/465.3 |
| 3,200,141 | 8/1965 | Milberger | 260/465.3 |
| 3,445,521 | 5/1969 | Callahan | 260/604 |
| 3,338,952 | 8/1967 | Callahan | 260/465.3 |
| 3,197,419 | 7/1965 | Callahan | 252/456 |

Primary Examiner—Daniel E. Wyman
Assistant Examiner—Philip M. French
Attorney—Cushman, Darby & Cushman

[57] ABSTRACT

This invention provides a multiple promoted iron oxide-antimony oxide catalyst composition having the empirical formula: $Fe_{10}Sb_{5-60}Me_{0.01-1}Te_{0.05-5}X_{0-1}O_{22-151}$ wherein Me is V, Mo or W, and X is P or B.

The catalyst composition of this invention exhibits an improved catalytic activity in an oxidation reaction selected from the group consisting of ammoxidation of olefins to nitriles, oxidation of olefins to aldehydes, and oxidative dehydrogenation of olefins ($C_4$-$C_8$) to diolefins, particularly in the case where high conversion is achieved and the amount of residual oxygen is very small.

For example, the catalysts of this invention [Ex. 1 and Ex. 12] and the catalysts of the prior art [R-1 and R-6] are prepared in the same manner, the compositions of these catalysts being as follows:

Ex. 1 : $Fe_{10}Sb_{25}W_{0.25}Te_{0.5-1}O_{67-68}\cdot(SiO_2)_{30}$
Ex. 12 : $Fe_{10}Sb_{25}W_{0.1}Te_{0.2-1}O_{66-68}\cdot(SiO_2)_{30}$
R-1 : $Fe_{10}Sb_{25}O_{65}\cdot(SiO_2)_{30}$
R-6 : $Fe_{10}Sb_{25}W_{1.5}O_{70}\cdot(SiO_2)_{30}$ Note: By "$(SiO_2)_{30}$" is meant silica carrier.

The activities of these catalysts are tested by the same method. The following maximum conversions (%) of olefins to acrylonitrile (AN), methacrylonitrile (MAN), acrolein (AL), methacrolein (MAL) and butadiene (BDE) are obtained:

| | AN | MAN | AL | MAL | BDE |
|---|---|---|---|---|---|
| Ex. 1 | 78 | 70 | 70 | 58 | 82 |
| Ex. 12 | 77 | 69 | 69 | 55 | 82 |
| R-1 | 65 | 53 | 33 | 26 | 73 |
| R-6 | — | 49 | 43 | 33 | 70 |

3 Claims, 1 Drawing Figure

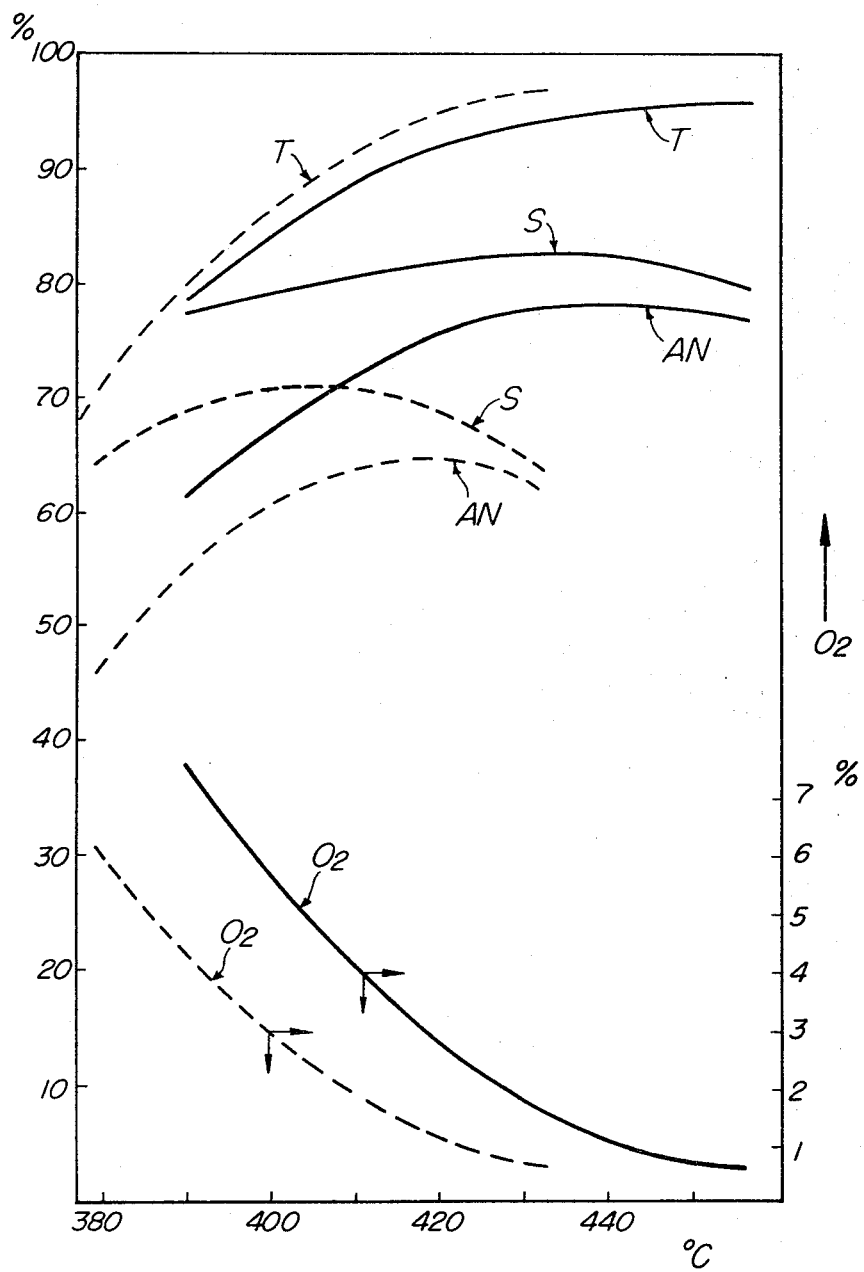

MULTIPLE PROMOTED IRON OXIDE-ANTIMONY OXIDE CATALYSTS FOR OXIDATION OF OLEFINS

This invention relates to multiple promoted oxidation catalysts containing the elements of iron and antimony, and more particularly it is concerned with multiple promoted iron oxide-antimony oxide catalysts which contain major amounts of iron oxide and antimony oxide in a specific range of atomic ratio of Fe/Sb as base catalyst components and very minor amounts of Me, Te and optionally X as promoter components, Me being an element or elements selected from the group consisting of V, Mo and W, and X being an element or elements selected from the group consisting of P and B.

The catalysts of this invention are particularly useful in the following oxidation reactions and they exhibit much improved catalytic activity relating to the formation of the object products:

i. Ammoxidation of olefins, such as propylene and isobutylene, to the corresponding unsaturated nitriles, such as acrylonitrile and methacrylonitrile, respectively;

ii. Oxidation of olefins, such as propylene and isobutylene, to the corresponding unsaturated aldehydes, such as acrolein and methacrolein, respectively; and iii. Oxidative dehydrogenation of olefins having from four to eight carbon atoms, such as 1-butene and 1-pentene, to the corresponding diolefins, such as butadiene and pentadiene, respectively.

It has been independently found by three research groups that an iron oxide-antimony oxide catalyst is useful in the catalytic ammoxidation of olefins to nitriles. See Japanese Patent No. 420,264 assigned to Nitto Chemical Co., Japan (Priority: Dec. 30, 1960), British Patent No. 983,755 assigned to Union Chemique-Chemische Bedrijven [UCB], Belgium (Priority: Sept. 7, 1961) and U.S. Patent No. 3,197,419 assigned to The Standard Oil Co., Ohio [Sohio], U.S.A. (Priorities: June 11, 1962 and Jan. 8, 1963).

The U.S. Patent discloses that the iron oxideantimony oxide catalyst is useful not only in the ammoxidation mentioned in above i. but also in the oxidation and the oxidative dehydrogenation mentioned in above ii. and iii., respectively.

In general, once a new catalyst has been disclosed, then it is a usual practice in recent catalyst studies to add into said new catalyst various metal and non-metal elements as far as one can realize and examine their promoter effect.

Such studies have already been carried out relating to the iron oxide-antimony oxide catalyst. Thus, Belgian Patent No. 641,143 and the corresponding U.S. Pat. No. 3,338,952 have attempted the addition of 25 metal elements to this catalyst and disclose their promoter effect. However, said patents disclose only the promoter effect of metal elements added in an amount of 1 to 10 per cent by weight into only one specific unpromoted iron oxide-antimony oxide catalyst having a very small atomic ratio of Fe/Sb (about 1:9). Also, the unpromoted catalyst has weak activity and the conversion of olefin to the object product obtained by using the catalyst is only 50 percent (Acrylonitrile), 41.3 percent (methacrylonitrile), 28.3 percent (acrolein), 24.7 percent (methacrolein) and 55 percent (butadiene), respectively. Further, there are not taken into consideration the changes in catalytic activities which would be caused by the quantitative variation of the promoter, by the combined use of the plural promoters and by the variation in the atomic ratio of Fe/Sb in the unpromoted catalysts.

The order of the promoter effect obtained by adding enumerately (without considering their quantitative variation) various metal elements into an unpromoted catalyst having a definite composition is not always kept constant regardless of the variation in the ratio of component elements in the unpromoted catalyst and the variation in the amount of the promoter added. It is rather usual that such an order is considerably affected by these variations. It is impossible at least from knowledge of catalyst chemistry up to the present to predict these relations.

There is a remarkable distinction in both of difficulty and commercial merit between the mere enumeration of as many metal elements as one can remember as a promoter and the actual formation of any optimum promoted catalyst achieved by selecting any combination of specific elements and determining the most effective amounts of them added in relation to the component ratio of unpromoted catalyst. The latter can not be anticipated from the former, because in order to reach the latter from the former without any inventive idea, it is necessary to carry out experiments on all possible combinations of metal elements and the number of tests to be carried out is too many to put into practice. Therefore, the latter can be reached from the former only by inventive actions including detailed study of unpromoted catalyst, recognition of desirable promoter effects appreciated through said study, the selection of promoters based on said recognition and any unexpected discovery through study for integrating these.

As an approach to a selection of any optimum promoted catalyst, we carried out detailed study of the characteristics of unpromoted iron oxide-antimony oxide catalyst with respect to the oxidation reactions, i., ii. and iii. mentioned above. The results of the study concerning to the ammoxidation of propylene to acrylonitrile are illustrated by dotted curves in the figure. Referring to the figure, the abscissa represents reaction temperature (°C.); the left ordinate represents various percentages showing reaction results, and the right ordinate represents the concentration of oxygen in the gas leaving the reactor, said concentration being expressed as per cent based on dry gas. By dry gas is meant gas components (oxygen, nitrogen, carbon dioxide, carbon monoxide, etc.) except vapor components which condense at ordinary temperature (acrylonitrile, acetonitrile, acrolein, hydrocyanic acid, water, etc.). Also, the symbols as used herein represent the following values, respectively:

T: Total conversion of olefin $$= \frac{\text{Carbon weight of olefin reacted}}{\text{Carbon weight of olefin charged}} \times 100\%$$

S: Selectivity of object product (acrylonitrile)

$$= \frac{\text{Carbon weight of object product formed}}{\text{Carbon weight of olefin reacted}} \times 100\%$$

AN: Conversion of olefin to object product $$= \frac{\text{Carbon weight of object product formed}}{\text{Carbon weight of olefin charged}} \times 100\%$$

$$= T \times S \times 1/100$$

$O_2$: Residual $O_2$ in effluent dry gas (percent)

Also, the unpromoted iron oxide-antimony oxide catalyst is hereinafter referred to as "Fe-Sb catalyst", "unpromoted catalyst" or "control catalyst" for the simplification of terms.

The conversion of propylene to acrylonitrile with Fe-Sb catalyst as shown by dotted lines AN in the figure reaches the highest value of about 65 percent at about 420° C. and has a tendency to gradually decrease at a higher temperature. Why does the conversion to acrylonitrile drop in spite of the fact that 5 percent or more of unreacted propylene still remains? In order to study this reason, total conversion of propylene T was determined and selectively of acrylonitrile S was also calculated.

The results are also shown by dotted line in the figure. Total conversion T increases with the rise of reaction temperature and reaches about 97 percent at 430° C. Selectivity S is found to tend to rapidly fall after reaching the highest value of about 71 percent at a temperature from 400° to 410° C. Thus, at a temperature above 410° C. a greater part of propylene is consumed by side reaction.

Although a conversion to acrylonitrile of 69 percent may be expected from the highest T value of 97 percent and the highest S value of 71 percent, the conversion is in fact only 65 percent since the condition under which the highest T value is obtained is different from the condition under which the highest S value is obtained.

These curves slightly move according to Fe/Sb atomic ratio in the catalyst and others, but the fundamental characteristics of Fe-Sb catalyst as understood by a mutual relation of these curves do not change.

Therefore, we studied a measure for maintaining the ascending tendency of selectivity S up to the point where T shows the highest value.

The effect of temperature on S value seems to be dominant judging from a relationship between S value and reaction temperature (abscissa). However, we have obtained a new knowledge that the S value tends to fall under such a condition that the amount of residual oxygen in reaction gas is a definite value or less, almost 3 percent or less, irrelevant to temperature, from the fact that deviation from a relationship between S value and reaction temperature occurs if Fe/Sb atomic ratio is changed or if the composition of the reaction material is changed.

Thus, we have found that Fe-Sb catalyst is essentially weak in a reducing atmosphere and the reduction of selectivity is caused and in extreme case the permanent degeneration and deterioration of the catalyst is caused if the catalyst is forced to act at a low oxygen concentration.

The above defect has been found not only in the ammoxidation of propylene to acrylonitrile but also in the ammoxidation of isobutylene to methacrylonitrile, the oxidation of propylene (or isobutylene) to acrolein (or methacrolein), and the oxidative dehydrogenation of an olefin such as 1-butene to a diolefin such as butadiene, although the degree of the defect changes to some extent depending on the sort of these oxidation reactions.

That is to say, in all of the ammoxidation, the oxidation and the oxidative dehydrogenation, the Fe-Sb catalyst exhibits only a poor selectivity of the object product at a high conversion level of olefin wherein the oxygen remaining unreacted is therefore in a very small amount, although it exhibits a relatively good selectivity of the object product at a low conversion level of olefin wherein the oxygen remaining unreacted is therefore in a large amount. These phenomena can be explained completely from the fact that the Fe-Sb catalyst is essentially weak in a reductive atmosphere.

It is possible to correct this defect to a certain degree by increasing the oxygen concentration in the reactant gases. However, the measure promotes extreme oxidation reactions such as the formation of $CO_2$ on the one hand. Also, the amount of gas to be treated undesirably increases and the cost of equipment increases because air is commercially used as oxygen source. Therefore, the measure is not necessarily advantageous from all-round point of view. It has been desired to improve the catalytic characteristic in low oxygen concentration atmosphere and to improve selectivity by the study of the catalyst itself.

From this viewpoint we have carried out many fundamental studies for the selection of promoters and we have found that an oxide of an element selected from the group consisting of vanadium, molybdenum and tungsten has a function of maintaining the catalytic activity even in low oxygen concentration area, and that at the same time coexistence of a tellurium oxide (or a tellurium oxide and a phosphorus or boron oxide) makes it possible to increase selectively of acrylonitrile without impairing the above function.

The promoted catalyst obtained by combining said element oxide and tellurium oxide with the Fe-Sb catalyst was found to have unexpectedly improved effect.

The characteristics of the promoted catalysts having catalytic properties in low oxygen concentration atmosphere improved by the addition of said element oxide and tellurium oxide are illustrated with respect to the ammoxidation of propylene to acrylonitrile by solid lines in the FIGURE.

Referring to the solid line in the FIGURE, total conversion of propylene T as shown by solid line T is somewhat lower than that obtained with the unpromoted catalyst at the same reaction temperature, but it increases with the rise of temperature and reaches 96 percent at a temperature of about 450° C.

On the other hand, selectivity of acrylonitrile as shown by solid line S is in a much higher level than that obtained with the unpromoted catalyst, and it increases also with the rise of temperature, reaches the highest value of about 82 percent at a temperature of about 440° C. where T reaches 95 percent, and then gradually falls at higher temperatures.

Therefore, conversion to acrylonitrile AN, which is the product of T and S divided by 100, also reaches the highest value of 78 percent at a temperature of about 440° C. A remarkable improvement can be observed as compared with the highest value of 65 percent obtained in the above-mentioned control or unpromoted catalyst. The reason for this is that not only the temperature condition for obtaining the highest S value was successfully shifted to the neighborhood of the temperature for obtaining the highest T value but also even the absolute value of the highest S value was unexpectedly increased by the addition of the above element oxide and tellurium oxide. Further, the condition was such as the concentration of residual oxygen was 1 percent or less (although the composition of the material was the same as in the previous case, more oxygen was consumed owing to the increase of total conversion). Thus, a remarkable effect of the addition of the above element oxide and tellurium oxide was clear. The promoted catalyst is a stable catalyst which is very easy to handle from the viewpoint of operation control since the area wherein the highest conversion to acrylonitrile can be obtained extends like a plateau centering around a temperature of 430° to 450° C.

An advantage of the improved catalyst similar to that discussed above relating to the ammoxidation of propylene to acrylonitrile, is also confirmed in the other ammoxidation as well as the oxidation and the oxidative dehydrogenation aforementioned. In said oxidation and oxidative dehydrogenation, however, the optimum reaction temperature for obtaining the maximum conversion of an olefin to the object product is somewhat higher when the improved catalyst is used than when the control catalyst is used. This tendency is remarkable especially in the oxidative dehydrogenation.

The present invention has been completed, based on the discovery of the above-mentioned new facts, by carrying out studies on the determination of the amount of an oxide of an element selected from the group consisting of vanadium, molybdenum and tungsten and the amount of tellurium oxide (as well as the amount of P and/or B component as optional additives) added to produce the largest effect and on the composition of the corresponding control catalyst or base catalyst.

The present invention provides a multiple promoted iron oxide-antimony oxide catalyst composition for an oxidation reaction selected from the group consisting of ammoxidation of olefins to the corresponding unsaturated nitriles, oxidation of olefins to the corresponding unsaturated aldehydes, and oxidative dehydrogenation of olefins having four–eight carbon atoms, to the corresponding diolefins, said catalyst composition having the empirical formula:

$$Fe_aSb_bMe_cTe_dX_eO_f$$

wherein $M_e$ represents an element selected from the group consisting of V, Mo and W; X represents an element selected from the group consisting of P and B; and $a$, $b$, $c$, $d$, $e$ and $f$ represent atomic ratios and $a = 10$
$b = 5-60$
$c = 0.01 - 1$
$d = 0.05 - 5$
$e = 0 - 1$
$f =$ the number of atoms in the oxide produced by combining the above-mentioned components which corresponds to 22-151.

The catalysts of this invention include Me-Te double promoted catalysts and Me-Te-X triple promoted catalysts, and both of them are particularly useful for the oxidation reactions afore-mentioned.

It is preferable to add the vanadium, molybdenum or tungsten component at an atomic ratio of from 0.01 to 1 per 10 of the iron component. If more vanadium, molybdenum or tungsten component is added, although the action of suppressing "degradation in low oxygen content" i.e. "the tendency of the decrease of selectivity with the decrease of the amount of residual oxygen in the gas formed" remains unchanged, the absolute value of selectivity undesirably falls. On the other hand, if less vanadium, molybdenum or tungsten component is added, its action of suppressing "degradation in low oxygen content" undesirably decreases.

The tellurium component is preferably added at an atomic ratio of from 0.05 to 5 per 10 of the iron component. If more tellurium component is added, the activity of the catalyst obtained is undesirably weakened, and when the catalyst is used in an atmosphere with a low oxygen content, "free-out" of metallic tellurium from the resulting catalyst is undesirably observed. On the other hand, if less tellurium component is added, the absolute value of selectivity undesirably decreases.

An atomic ratio of iron to antimony should be within the range of from 10:5 to 10:60, preferably within the range of from 10:10 to 10:60. This is an experimentally determined range wherein the highest promoter effect is produced and high conversion to acrylonitrile can be obtained.

In the catalyst of this invention, phosphorus or boron component functions as an assistant of the tellurium component, and it contributes to economizing in tellurium. Accordingly, the phosphorus or boron component may be added to the catalyst of this invention, although the addition is not indispensable. When the addition is desired, it is preferable to add the phosphorus or boron component at an atomic ratio of less then 1 per 10 of the iron component. If more phosphorus or boron component is added, the activity of the resulting catalyst is undesirably too weakened.

As disclosed above, the addition of the tellurium component contributes to a great increase of selectivity, but over-addition thereof aids undesirable "free-out" of metallic tellurium from the resulting catalyst. The addition of the phosphorus or boron component, compared with the case of non-addition thereof, makes it possible to give the same or a similar result even with a smaller amount of the tellurium, thus the addition thereof brings about an advantage of enlarging the safety use range of the catalyst.

The catalysts having the above-mentioned composition can be produced by any known method, although it is particularly necessary that the components are intimately mixed and combined. The strict chemical structure of a material constituting the catalyst is unknown but said empirical formula is obtained as analytical value.

The starting material for providing the iron component of the catalyst can be selected from many members. For example, iron oxide in the form of ferrous oxide, ferric oxide or ferro-ferric oxides can be used. Also, such compounds as are finally stabilized as iron oxide after chemical treatment, calcining treatment or the like may be used. Those compounds include iron salts of inorganic acid such as iron nitrate and iron chloride, iron salts of organic acid such as iron acetate and iron oxalate, etc. The salts can be converted into oxide by neutralizing them with a basic substance such as aqueous ammonia to form iron hydroxide and then calcining acid iron hydroxide or by directly calcining these salts. Further, iron hydroxide or metallic iron can be used. The metallic iron may be added in the form of fine powder or may be treated with heated nitric acid. In the latter case iron is converted into ferric nitrate. Whatever starting material is selected, it is important to intimately mix the material with other components. Therefore, it is preferably added in the form of fine powder, aqueous solution or sol.

The starting material for the antimony component may be antimony oxide such as, for example, antimony trioxide, antimony tetroxide or antimony pentoxide. Also, such compounds as are finally stabilized as antimony oxide after chemical treatment, calcining treatment or the like may be used. For example, those compounds include hydrous antimony oxide, metaantimonic acid, orthoantimonic acid, pyroantimonic acid or the like. Also, hydrolyzable antimony salts such as antimony halides, for example, antimony trichloride and antimony pentachloride may be used. These antimony halides are hydrolyzed with water into hydrous oxides. The antimony halides may be used as they are since they are volatile at high temperatures.

Any one of water soluble or insoluble vanadium compounds can be used as the vanadium component source. For example, vanadium pentoxide, ammonium metavanadate, vanadyl oxalate, vanadium halides or the like may be used. Further, metallic vanadium can be used. It may be directly used in the form of metallic powder or may be reacted with heated nitric acid to form oxide.

Water soluble or insoluble molybdenum compounds may be used as the molybdenum component source. For example, molybdenum trioxide, molybdic acid, ammonium paramolybdate, ammonium metamolybdate, molybdenum halides or the like may be used. Further, metallic molybdenum can be used. It may be directly used in the form of metallic powder or may be reacted with heated nitric acid to form oxide.

With respect to the tungsten component source, there is applicable the same as described concerning the molybdenum component source.

Water soluble or insoluble tellurium compounds may be used as the tellurium component source. For instance, tellurium dioxide, tellurous acid or telluric acid may be used. Further, metallic tellurium may be used. Further, metallic tellurium may be used. It may be directly used in the form of a metallic powder or may be reacted with heated nitric acid to form an oxide.

It is desirable to prepare the catalyst by mixing the vanadium, molybdenum or tungsten component and the tellurium component with the iron and antimony component intimately. Alternatively, a control catalyst may be prepared and then impregnated with the vanadium molybdenum or tungsten component and the tellurium component. In this case, it is preferable to prepare an aqueous solution of the above promoter components and to dip said control catalyst in the aqueous solution to effect impregnation. The impregnation operation is preferably carried out before final calcining treatment.

In the above-mentioned impregnation of the control catalyst, the phosphorus or boron component may be added to the aqueous solution of the above promoter components or the control catalyst may be separately impregnated with the phosphorus or boron component, or the control catalyst may contain the phosphorus or boron component.

The starting material for the phosphorus or boron component may be any phosphorus or boron compound, but it is most convenient to add the component in the form of phosphoric acid or boric acid.

The activity of this catalyst system may be increased by heating at a high temperature. The catalyst material composition which has been prepared to provide the desired composition and has been intimately mixed is preferably dried, heated at a temperature of 200° to 600° C. for 2 to 24 hours and, if necessary, then heated at a temperature within a range of 700° to 1,100° C. for 1 to 48 hours. The materials should be blended so that the catalyst may have a fixed composition when the catalyst is used in the reaction after the calcining treatment.

The catalyst can show excellent activity even without any carrier, but it may be combined with any suitable carrier. The entire catalyst may contain 10 to 90 percent by weight of the catalyst composition aforementioned and 90 to 10 percent by weight of a carrier component. As a carrier silica, alumina, zirconia, silica alumina, silicon carbide, alundum, inorganic silicate, etc. may be used.

Any other additives such as a bonding agent, which serve for improving the physical properties of the catalyst, may be optionally added unless they impair the activity of the catalyst.

These additives such as a carrier, a bonding agent, an extender, etc. can be optionally added irrespective of their components unless they remarkably change the characteristics of the catalyst of the present invention disclosed by the above explanation or the examples mentioned below. The catalyst containing these additives should be also regarded as the catalyst of the present invention.

The catalyst may be used in a fixed-bed reaction in the form of pellet or may be used in a fluid-bed reaction in the form of fine grain.

The reaction conditions for the use of the catalyst of the present invention will be explained below.

AMMOXIDATION OF OLEFINS TO NITRILES

The reactants used in the ammoxidation of olefins to nitriles are oxygen, ammonia and an olefin.

The olefins should have only three carbon atoms in a straight chain, and they are preferably selected from the group consisting of propylene and isobutylene. The olefins may be in admixture with paraffinic hydrocarbons such as ethane, propane, butane and pentane. This makes it possible to use an ordinary refinery stream without special treatment.

Any oxygen source may be used, but air is usually used for economical reasons. Air may be suitably enriched with oxygen. The molar ratio of oxygen to olefin may be about 0.5:1 or higher, and more desirably is 1:1 or higher. Preferable molar ratio is in the range of from about 2:1 to about 6:1.

The molar ratio of ammonia to olefin is suitably within the range of from about 0.7:1 to about 3:1, but it is substantially unnecessary that the molar ratio is 1.5:1 or higher because the catalyst of the present invention does not decompose ammonia. The fact that ammonia is not decomposed is advantageous in that the use of excess ammonia is unnecessary and no oxygen loss is caused by the consumption of oxygen for the decomposition of ammonia and thereby the molar ratio of oxygen to olefin can be maintained at a sufficiently high value during the reaction. This contributes to the improvement of conversion of olefins to the corresponding unsaturated nitriles.

A hitherto known bismuth phosphomolybdate catalyst has a defect that its ammonia decomposition ability is high. According to our experiment concerning this catalyst, it is required to suppress the decomposition of ammonia that not less than 3 mols of water per mol of olefin is added. On the other hand, the catalyst of this invention requires substantially no addition of water for the same purpose. The addition of water is disadvantageous from thermal and operational viewpoints.

However, the addition of water is somewhat effective for suppressing the formation of carbon dioxide, and accordingly water may be added in the present invention, if necessary. In that case, not more than five mols of water added per mol of olefin is sufficient.

As is clear from the fact that air which is a mixture of oxygen and nitrogen can be used as the oxygen source instead of pure oxygen, any suitable diluent may be used.

It is preferable but not always indispensable to feed an olefin, oxygen, ammonia and any optional diluent into a reactor in the form of a gaseous mixture thereof. If desired, liquefyable components may be charged in the form of a liquid. Also, these materials may be charged separately into the reactor through a few inlets. These materials, however, should be in the form of a gaseous mixture when they are contacted with the catalyst. The reaction temperature is suitably about 350° to about 550° C. and reaction temperature of about 370° to about 500° C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 500 to about 200 hr.$^{-1}$ gives particularly good results. By space velocity is meant the volume (calculated in NTP) of gas passing per unit volume of catalyst per hour.

Desired unsaturated nitrile can be recovered from the reaction product by washing the gas leaving the reactor through its exit with cold water or a solvent which is suitable for the extraction of the nitrile. Any other recovery process which is customarily used in this kind of reaction may be used.

In the practice of the present invention, any one of the fixed-bed type, moving-bed type and fluid-bed type apparatus, which are customarily used in vapor phase catalytic reactions, can be used.

OXIDATION OF OLEFINS TO ALDEHYDES

The reactants used in the oxidation of olefins to aldehydes are oxygen and an olefin.

The olefins and the oxygen sources are the same as described above.

The molar ratio of oxygen to propylene may be about 0.5:1 or higher, and more desirably is 1:1 or higher. Preferable molar ratio is in the range of from about 2:1 to about 6:1.

The addition of water is somewhat effective for suppressing the formation of carbon dioxide, and water may be added in the present invention, if necessary. In that case, not more than five mols of water added per mol of propylene is sufficient.

The reaction temperature is suitably about 350° to about 550° C. and reaction temperature of about 370° to 500° C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 1,000 to about 400 hr.$^{-1}$ gives particularly good results. The definition of space velocity is the same as mentioned above.

Desired unsaturated aldehyde can be recovered from the reaction product by washing the gas leaving the reactor through its exit with cold water or a solvent which is suitable for the extraction of the aldehyde. Any other recovery process which is customarily used in this kind of reaction may be used.

With respect to the feeding procedures of reactants into a reactor, and the types of the reactor, there is applicable the same as mentioned concerning the ammoxidation except for ammonia.

OXIDATIVE DEHYDROGENATION OF OLEFINS TO DIOLEFINS

The reactants used in the oxidative dehydrogenation of olefins to diolefins are oxygen and an olefin.

By the term "olefin" used concerning oxidative dehydrogenation is meant an open chain olefin having four–eight nonquaternary carbon atoms, of which at least four are arranged in series in a straight chain. The olefins include 1-butene, cis-2-butene, trans-2-butene, 2-methyle-1-propene, 1-pentene, cis-2-pentene, trans-2-pentene, 2-methyl-1-butene, 3-methyl-1-butene, 3-methyl-2-butene, 2-hexene, 2-methyl-1-pentene, 3-methyl-1-pentene, 4-methyl-1-pentene, 2-methyl-2-pentene, 3-ethyl-1-pentene, 2-ethyl-1-hexene and the like.

According to this invention, the olefins can be converted to the corresponding diolefins with an improved yield. For instance, there are obtained butadiene from butenes (1-butene, cis-2-butene, trans-2-butene or mixture thereof), pentadiene from 1-pentene or 2-pentene, isoprene from 2-methyl-1-butene, and hexadiene from 1-hexene.

Recently, the oxidative dehydrogenation of butenes to butadiene is noted because of its commercial importance. According to this invention, as the butene sources, there may be used not only 1-butene, cis-2-butene, trans-2-butene and the mixture thereof, but also spent B—B fraction which is obtained from B—B fraction by removing butadiene and isobutylene therefrom, said B—B fraction being obtained in petroleum refinery or by thermal cracking of petroleum fractions such as naphtha. In case of using said spent B—B fraction, paraffins contained therein are substantially inert in a reaction zone according to this invention. With respect to isobutylene which still remains in said material as impurity not completely removed therefrom, it is converted mainly to methacrolein in a reaction zone according to this invention. It is, however, easy to separate the methacrolein from the object product (butadiene) by utilizing the boiling temperature difference between them and/or the solubility difference in a solvent between them.

Any oxygen source may be used, but air is usually used for economical reasons. Air may be suitably enriched with oxygen. The molar ratio of oxygen to propylene is desirably 0.5:1 or higher. Preferable molar ratio is in the range of from about 1:1 to about 4:1.

The addition of water is somewhat effective for suppressing the formation of carbon dioxide, and water may be added in the present invention, if necessary. In that case, not more than 5 mols of water added per mol of propylene is sufficient.

The reaction temperature is suitably about 300° to about 550° C. and reaction temperature of about 340° to 480° C. gives particularly good results. It is preferable from operational point of view to carry out the reaction at about atmospheric pressure, but, if necessary, the reaction may be carried out at reduced pressure or under pressure.

Space velocity is also one of the reaction conditions in a vapor phase catalytic reaction using a solid catalyst. In the process of the present invention, space velocity of about 2,000 to about 100 hr.$^{-1}$ is suitable and space velocity of about 500 to about 150 hr.$^{-1}$ gives particularly good results. By space velocity is meant the volume (calculated in NTP) of gas passing per unit volume of catalyst per hour.

Desired diolefin can be recovered from the reaction product by washing the gas leaving the reactor through its exit with cold water or a solvent which is suitable for the extraction of the diolefin. Any other recovery process which is customarily used in this kind of reaction may be used.

With respect to the feed procedures of reactants into a reactor, and the types of the reactor, there may be applicable the same as mentioned concerning the ammoxidation except for ammonia.

The constitution and effect of the present invention are illustrated by the following examples and comparative examples.

CATALYSTS PREPARATIONS

Comparative Example 1

An unpromoted (control) catalyst having the empirical formula: $Fe_{10}Sb_{25}O_{65}(SiO_2)_{30}$ was prepared as follows:

Sixty-one Grams of metallic antimony powder (200 mesh or finer) was added in portions to 230 ml of heated nitric acid (specific gravity: 1.38). After the whole amount of the antimony had been added and the generation of a brown gas had ceased, the mixture was allowed to stand at room temperature for 16 hours. Excess nitric acid was then removed and the precipitate formed was washed three times with 100 ml of water (I).

11.2 Grams of electrolytic iron powder was added in portions to a mixture consisting of 81 ml of nitric acid (specific gravity: 1.38) and 100 ml of water to completely dissolve (II).

One hundred and eighty Grams of silica sol ($SiO_2$: 20 percent by weight) was used as a carrier component (III).

These three components were mixed. An aqueous ammonia solution (28 percent) was added in portions with stirring to adjust the pH of the mixture to 2. The mixture was then boiled to dryness with stirring.

The dry residue was crushed and then calcined at 200° C. for 2 hours and at 400° C. for 2 hours. The product was kneaded with water and then formed into pellets. It was dried at 130° C. for 16 hours and then calcined in air at 900° C. for 2 hours.

EXAMPLE 1

A. A promoted catalyst having the empirical formula: $Fe_{10}Sb_{25}W_{0.25}Te_{0.5}O_{67} \cdot (SiO_2)_{30}$ (W is 0.72 percent by weight and Te is 0.99 percent by weight based on the weight of the Fe-Sb-Si system control catalyst) was prepared as follows:

60.9 Grams of metallic antimony powder (100 mesh or finer) was added in portions to 225 ml of heated nitric acid (specific gravity: 1.38). After the whole amount of the antimony had been added and the generation of brown gas had ceased, the mixture was allowed to stand at room temperature for 16 hours. Excess nitric acid was then removed and the precipitate formed was washed three times with 100 ml of water (I).

11.2 Grams of electrolytic iron powder was added in portions to a mixture consisting of 81 ml of nitric acid (specific gravity: 1.38) and 100 ml of water to completely dissolve (II).

1.3 Grams of ammonium tungstate [$5(NH_4)_2O \cdot 12WO_3 \cdot 5H_2O$ described in Merck Index] was dissolved in 50 ml of water. 2.3 Grams of telluric acid $H_6TeO_6$ was added to dissolve in the solution of ammonium tungstate prepared above (III).

As a carrier component 180 grams of silica sol ($SiO_2$: 20 percent by weight) was used (IV).

(II) was mixed with (IV), and then (III) was added thereto. The resulting liquid and (I) were intimately mixed and an aqueous ammonia solution (28 percent) was added in portions with stirring to adjust the pH of the mixture to 2. The mixture was then boiled to dryness.

The dry residue was crushed and then calcined at 200° C. for 2 hours and at 400° C. for 2 hours. The product was kneaded with water and then formed into pellets. It was dried at 130° C. for 16 hours and then calcined at 900° C. for 2 hours.

B. A promoted catalyst having the empirical formula: $Fe_{10}Sb_{25}W_{0.25}Te_{1.0}O_{68} \cdot (SiO_2)_{30}$ (W is 0.72 per cent by weight and Te is 1.98 percent by weight based on the weight of the Fe-Sb-Si system control catalyst) was prepared in the same manner as in the above A except that the tellurium component was used in an amount two times that in A.

EXAMPLE 2

A promoted catalyst having the empirical formula: $Fe_{10}Sb_{25}W_{0.1}Te_{0.5}O_{66} \cdot (SiO_2)_{30}$ (W is 0.29 percent by weight and Te is 0.99 percent by weight based on the weight of the Fe-Sb-Si system control catalyst) was prepared in the same manner as in Example 1.

EXAMPLE 3

A promoted catalyst having the empirical formula: $Fe_{10}Sb_{60}W_{0.6}Te_{0.2}O_{137} \cdot (SiO_2)_{60}$ (W is 0.82 percent by weight and Te is 0.19 percent by weight based on the weight of the Fe-Sb-Si system control catalyst) was prepared as follows:

Antimony oxychloride precipitate was prepared by adding 3 l of water to 137 grams of antimony trichloride $SbCl_3$, stirring the mixture thoroughly, hydrolyzing and then allowing the mixture to stand. The precipitate was filtered off, washed twice with 200 ml of water and then suspended in 1 l of water (I).

5.6 Grams of electrolytic iron powder was added in portions to a mixture consisting of 41 ml of nitric acid (specific gravity: 1.38) and 50 ml of water to completely dissolve (II).

1.0 Grams of ammonium tungstate was dissolved in 50 ml of water. 0.46 Gram of telluric acid was added to dissolve in the solution of ammonium tungstate prepared above (III).

One hundred and eighty Grams of silica sol ($SiO_2$: 20 percent by weight) was used as a carrier component.

These five components were intimate mixed and boiled with vigorous stirring. Thus, antimony oxychloride was hydrolyzed into antimony oxide and hydrochloric acid produced was vented into air.

After evaporating to dryness, the resulting product was crushed, formed and calcined in the same manner as in Example 1 (final calcining: 900° C., 2 hours).

EXAMPLE 4

A promoted catalyst having the empirical formula: $Fe_{10}Sb_{13}W_{0.07}Te_{0.33}O_{42} \cdot (SiO_2)_{20}$ (W is 0.3 per cent by weight and Te is 1.05 per cent by weight based on the weight of the control catalyst) was prepared in the same manner as in Example 1 except that 1.5 g. of tellurium dioxide was used instead of telluric acid.

EXAMPLE 5

A promoted catalyst having the empirical formula: $Fe_{10}Sb_{13}W_{0.07}Te_{0.66}O_{43} \cdot (SiO_2)_{20}$ (W is 0.3 per cent by weight and Te is 2.1 per cent by weight based on the weight of the control catalyst) was prepared in the same manner as in Example 1.

EXAMPLE 6

A. A promoted catalyst having an empirical formula: $Fe_{10}Sb_{10}W_{0.03}Te_{2.3}O_{40} \cdot (SiO_2)_{20}$ (W is 0.16 per cent by weight and Te is 4.76 per cent by weight based on the weight of the control catalyst) was prepared in the same manner as in Example 1.

B. A promoted catalyst having the empirical formula: $Fe_{10}Sb_{10}W_{0.03}Te_{2.5}O_{40} \cdot (SiO_2)_{20}$ (W is 0.16 percent by weight and Te is 5.18 percent by weight based on the weight of the control catalyst) was prepared in the same manner as in Example 1 except that the final calcination of the catalyst was carried out at 925° C. for 2 hours.

EXAMPLE 7

A. A promoted catalyst having the empirical formula: $Fe_{10}Sb_{25}V_{0.25}Te_{0.5}O_{67} \cdot (SiO_2)_{30}$ (V is 0.19 percent by weight and Te is 0.99 per cent by weight based on the weight of the control catalyst) was prepared in the same manner as in Example 1 except that 0.6 g. of ammonium metavanadate was used instead of 1.3 g. of ammonium tungstate. The catalyst having the above composition was calcined at 900° C. for 2 hours as in Example 1.

B. The catalyst having the above composition was calcined at 925° C. for 2 hours instead of calcining at 900° C. for 2 hours.

EXAMPLE 8

A promoted catalyst having the empirical formula: $Fe_{10}Sb_{25}V_{0.1}Te_{0.25}O_{66} \cdot (SiO_2)_{30}$ (V is 0.08 percent by weight and Te is 0.50 per cent by weight based on the weight of the control catalyst) was prepared in the same manner as in Example 1 except that ammonium metavanadate was used instead of ammonium tungstate.

EXAMPLE 9

A. A promoted catalyst having the empirical formula: $Fe_{10}Sb_{13}V_{0.07}Te_{0.33}O_{42} \cdot (SiO_2)_{20}$ (V is 0.09 percent by weight and Te is 1.04 per cent by weight based on the weight of control catalyst) was prepared in the same manner as in Example 1, except that ammonium metavanadate was used as the vanadium source and tellurium dioxide was used as the tellurium source. The catalyst having the above composition was calcined at 900° C. for 2 hours.

B. The catalyst having the above composition was calcined at 925° C. for 2 hours instead of calcining at 900° C. for 2 hours.

EXAMPLE 10

A promoted catalyst having the empirical formula: $Fe_{10}Sb_{13}Mo_{0.07}Te_{0.33}O_{42} \cdot (SiO_2)_{20}$ (Mo is 0.17 percent by weight and Te is 1.04 percent by weight based on the weight of the control catalyst) was prepared in the same manner as in Example 1 except that ammonium molybdate $[3(NH_3)_2O \cdot 7MoO_3 \cdot 4H_2O]$ was used instead of ammonium tungstate.

EXAMPLE 11

A promoted catalyst having the empirical formula: $Fe_{10}Sb_{25}Mo_{0.1}Te_{0.5}O_{66} \cdot (SiO_2)_{30}$ (Mo is 0.15 per cent by weight and Te is 0.99 per cent by weight based on the weight of the control catalyst) was prepared according to Example 10.

EXAMPLE 12

A. A promoted catalyst having an empirical formula: $Fe_{10}Sb_{25}W_{0.1}Te_{0.2}P_{0.2}O_{66} \cdot (SiO_2)_{30}$ (W is 0.31 percent by weight, Te is 0.40 per cent by weight and P is 0.10 percent by weight based on the weight of the control catalyst) was prepared in the same manner as in Example 1 except that phosphoric acid was used as the phosphorus component source and it was added to the mixed solution of ammonium tungstate and telluric acid.

B. A promoted catalyst having the empirical formula: $Fe_{10}Sb_{25}W_{0.1}Te_{1.0}P_{0.2}O_{68} \cdot (SiO_2)_{30}$ (W is 0.30 percent by weight, Te is 1.98 percent by weight and P is 0.10 percent by weight based on the weight of the control catalyst) was prepared according to the above (B) procedure.

EXAMPLE 13

A promoted catalyst having the empirical formula: $Fe_{10}Sb_{10}W_{0.03}Te_{0.5}B_{0.8}O_{37} \cdot (SiO_2)_{20}$ (W is 0.09 percent by weight, Te is 1.49 per cent by weight and B is 0.14 percent by weight based on the weight of the control catalyst) was prepared in the same manner as in Example 1 except that boric acid as the boron component source was added to the mixed solution of ammonium tungstate and telluric acid.

EXAMPLE 14

A promoted catalyst having the empirical formula: $Fe_{10}Sb_{13}V_{0.07}Te_{0.2}P_{0.1}O_{42} \cdot (SiO_2)_{20}$ (V is 0.08 percent by weight, Te is 0.63 percent by weight and P is 0.07 percent by weight based on the weight of the control catalyst) was prepared in the same manner as in Example 9 (B) except that phosphoric acid as the phosphorus component source was added to the mixed solution of ammonium metavanadate and telluric acid.

EXAMPLE 15

A promoted catalyst having the empirical formula: $Fe_{10}Sb_{13}Mo_{0.07}Te_{0.2}B_{0.1}O_{42} \cdot (SiO_2)_{20}$ (Mo is 0.16 percent by weight, Te is 0.63 percent by weight and B is 0.027 per cent by weight based on the weight of the control catalyst) was prepared in the same manner as in Example 10 except that boric acid as the boron component source was added to the mixed solution of ammonium molybdate and telluric acid.

EXAMPLE 16

A promoted catalyst having the empirical formula: $Fe_{10}Sb_{25}W_{0.5}Te_{1.0}O_{69} \cdot (SiO_2)_{30}$ (W is 1.44 percent by weight and Te is 1.98 percent by weight based on the weight of the control catalyst) was prepared in the same manner as in Example 1.

COMPARATIVE EXAMPLE 2

An unpromoted (control) catalyst having the empirical formula: $Fe_{10}Sb_{60}O_{135} \cdot (SiO_2)_{60}$ was prepared as follows:

73.3 Grams of metallic antimony powder (100 mesh or finer) was added in portions to 270 cc of heated nitric acid (specific gravity: 1.38). After the whole amount of the antimony had been added and the generation of brown gas had ceased, the mixture was allowed to stand at room temperature for 16 hours. Excess nitric acid was then removed and the precipitate formed was washed five times with 200 ml of water (I).

5.6 Grams of electrolytic iron powder was added in portions to a mixture consisting of 41 ml of nitric acid (specific gravity: 1.38) and 50 ml of water to completely dissolve (II).

One hundred and eighty Grams of silica sol ($SiO_2$: 20 percent by weight) was used as a carrier component (III).

These three components (I), (II) and (III) were mixed. An aqueous ammonia solution (28 percent) was added in portions with stirring to adjust the pH of the mixture to 2. The slurry was then boiled to dryness with stirring.

The dry residue was crushed and calcined at 200° C. for 2 hours and then at 400° C. for 2 hours. The product was kneaded with water and formed into pellets. It was dried at 130° C. for 16 hours and then calcined in air at 850° C. for 5 hours.

COMPARATIVE EXAMPLE 3

A. An unpromoted (control) catalyst having the empirical formula: $Fe_{10}Sb_{13}O_{41} \cdot (SiO_2)_{20}$ was prepared in the same manner as in Comparative Example 2 except that the final calcination of the catalyst was carried out at 950° C. for 2 hours.

B. In the preparation of the catalyst described above, the final calcination of the catalyst was carried out at 925° C. for 2 hours.

COMPARATIVE EXAMPLE 4

A catalyst having the empirical formula: $Fe_{10}Sb_{25}W_{0.25}O_{66} \cdot (SiO_2)_{30}$ (W is 0.72 per cent by weight based on the weight of the control catalyst) was prepared in the same manner as in Example 1 except that no tellurium component was added.

COMPARATIVE EXAMPLE 5

A catalyst having the empirical formula: $Fe_{10}Sb_{13}Te_{0.33}O_{42} \cdot (SiO_2)_{20}$ (Te is 1.06 per cent by weight based on the weight of the control catalyst) was prepared in the same manner as in Example 4 except that no tungsten component was added.

COMPARATIVE EXAMPLE 6

A. A catalyst having the empirical formula: $Fe_{10}Sb_{25}W_{1.5}O_{70} \cdot (SiO_2)_{30}$ (W is 4.35 percent by weight based on the weight of the control catalyst) was prepared as in Example 1 except that no tellurium component was added. The final calcination of the catalyst was carried out at 900°C. for 2 hours.

B. In the catalyst preparation described above, the final calcination of the catalyst was carried out at 925° C. for 2 hours.

ACTIVITY TESTS AND THEIR RESULTS

The activity tests of the catalysts obtained by the above preparations were carried out as follows:

1. Ammoxidation of Propylene to Acrylonitrile 50 ml of a catalyst which had been formed into 4 mm × 4 mm $\phi$ pellet was charged into a steel U-tube reactor having an inside diameter of 16 mm. The reactor was heated by niter consisting of a 1:1 mixture of sodium nitrite and potassium nitrate.

Into the reactor was introduced a gas having the following composition at a rate of 10 liters per hour (NTP). The reaction pressure was nearly atmospheric pressure.

$O_2$ (supplied as air) / propylene = 2.2 : 1 (molar ratio)
$NH_3$ / propylene = 1.3 : 1 (molar ratio)

The temperature of niter was successively changed and the reaction was carried out for several hours at each temperature.

The reaction gas was recovered and then analyzed by a gas chromatography.

For each catalyst, the optimum temperature for providing the highest conversion of propylene to acrylonitrile as well as the conversion and selectivity obtained at said optimum temperature were determined.

The test results thus obtained are shown in Table 1. With respect to the unpromoted catalyst of Comparative Example 1 and the promoted catalyst of Example 1, the detailed results thereof are shown by dotted lines and solid lines, respectively, in FIG. 1, and they are already explained fully in the descriptive part of this specification.

2. Ammoxidation of Isobutylene to Methacrylonitrile

Twenty-five ml of a catalyst which had been formed into 2 mm × 2 mm $\phi$ pellet was charged into a fixed bed reactor having an inside diameter of 16 mm and a longitudinal length of 500 mm.. The reactor was heated by niter consisting of a 1:1 mixture of sodium nitrite and potassium nitrate.

Into the reactor was introduced a gas having the following composition at a rate of 11.5 liters per hour (NTP). The reaction pressure was nearly atmospheric pressure.

$O_2$ (supplied as air) / isobutylene = 3.5 : 1 (molar ratio)
$NH_3$ / isobutylene = 1.2 : 1 (molar ratio)
$H_2O$ / isobutylene = 4 : 1 (molar ratio)

The temperature of niter was successively changed and the reaction was carried out for several hours at each temperature.

The reaction gas was recovered and then analyzed by a gas chromatography.

For each catalyst, the optimum temperature for providing the highest conversion of isobutylene to methacrylonitrile as well as the conversion and selectivity obtained at said optimum temperature were determined.

The rest results thus obtained are shown in Table 2.

3. Oxidations of Propylene and Isobutylene to Acrolein and Methacrolein, respectively.

Twenty-five ml of a catalyst which had been formed into 2 mm × 2 mm $\phi$ pellet was charged into a fixed bed reactor having an inside diameter of 16 mm and a longitudinal length of 500 mm. The content was heated by niter consisting of a 1:1 mixture of sodium nitrite and potassium nitrate.

Into the reactor was introduced a gas having the following composition at the following rate. The reaction pressure was nearly atmospheric pressure. Condition 1

$O_2$ (supplied as air) / propylene = 2.5 : 1 (molar ratio)
$H_2O$ / propylene = 4.0 : 1 (molar ratio)
Feed rate = 15 l (NTP) / hour Condition 2

$O_2$ (supplied as air) / isobutylene = 4.5 : 1 (molar ratio)
$H_2O$ / isobutylene = 5.0 : 1 (molar ratio)
Feed rate = 22 l (NTP) / hour The temperature of niter was successively changed and the reaction was carried out for several hours at each temperature.

The reaction gas was recovered and then analyzed by a gas chromatography.

For each catalyst, the optimum temperature for providing the highest conversion of olefins to the corresponding unsaturated aldehydes as well as the conversion and selectivity obtained at said optimum temperature were determined.

The test results thus obtained are shown in Table 3 (oxidation of propylene) and Table 4 (oxidation of isobutylene).

4. Oxidative Dehydrogenation of Butenes (1-butene, 2-butene or the mixture thereof) to Butadiene.

Twenty-five ml of a catalyst which had been formed into 2 mm × 2 mm $\phi$ pellet was charged into a fixed bed reactor having an inside diameter of 16 mm and a longitudinal length of 500 mm.. The reactor was heated by niter consisting of a 1:1 mixture of sodium nitrite and potassium nitrate.

Into the reactor was introduced a gas having the following composition at the following rate. The reaction pressure was nearly atmospheric pressure.

Condition 1

Air / 1-butene = 5 : 1 (molar ratio)
$H_2O$ / 1-butene = 1.5 : 1 (molar ratio)
Feed rate = 7.5 l (NTP) / hour Condition 2

Air / 2-butene = 7 : 1 (molar ratio)
$H_2O$ / 2-butene = 1.5 : 1 (molar ratio)
Feed rate = 10 l (NTP) / hour Condition 3

Air / mixed butene = 7 : 1 (molar ratio)
H₂O / mixed butene = 1.5 : 1 (molar ratio)
Feed rate = 10 l (NTP) / hour
  [mixed butene = 1-butene 30 percent + 2-butene 70 percent]

The temperature of niter was successively changed and the reaction was carried out for several hours at each temperature.

The reaction gas was recovered and then analyzed by a gas chromatography.

For each catalyst, the optimum temperature for providing the highest conversion of olefins (butene) to diolefin (butadiene) as well as the conversion and selectivity obtained at said optimum temperature were determined.

The test results thus obtained are shown in Table 5 (Condition 1), Table 6 (Condition 2) and Table 7 (Condition 3).

The definitions of total conversion of olefin, selectivity of object product, and conversion of olefin to object product are the same as or analogous to the definitions of T, S and AN shown in the explanation of FIG. 1, respectively. In case of oxidative dehydrogenation of olefins to diolefins, however, the term "Carbon weight of olefin reacted" should read "[Carbon weight of olefin charged] - [Carbon weight of olefin recovered]".

TABLE 1.—AMMOXIDATION OF PROPYLENE

| | Composition of catalyst (atomic ratio) | | | | | | Optimum calcining conditions | | Optimum reaction temp. (°C.) | Conversion of propylene to— (percent) | | | | | | Total conversion (percent) | AN selectivity (percent) |
|---|---|---|---|---|---|---|---|---|---|---|---|---|---|---|---|---|---|
| | Fe | Sb | Me | Te | X | Si | Temp. (°C.) | Time (hrs.) | | AN | CO₂ | CO | HCN | ATN | AL | | |
| Ex. No.: | | | | | | | | | | | | | | | | | |
| 1(A) | 10 | 25 | 0.25 W | 0.5 | 0 | 30 | 900 | 2 | 440 | 78 | 8 | 4 | 4 | 1 | 0 | 95 | 82 |
| 2 | 10 | 25 | 0.1 W | 0.5 | 0 | 30 | 900 | 2 | 470 | 76 | 8 | 5 | 5 | 1 | Tr. | 95 | 80 |
| 3 | 10 | 60 | 0.6 W | 0.2 | 0 | 60 | 900 | 2 | 450 | 74 | 7 | 4 | 7 | 1 | 0 | 93 | 80 |
| 4 | 10 | 13 | 0.07 W | 0.33 | 0 | 20 | 900 | 2 | 430 | 78 | 8 | 4 | 7 | 0 | Tr. | 97 | 81 |
| 5 | 10 | 13 | 0.07 W | 0.66 | 0 | 20 | 900 | 2 | 450 | 78 | 7 | 3 | 6 | 0 | Tr. | 94 | 83 |
| 6(A) | 10 | 10 | 0.03 W | 2.3 | 0 | 20 | 900 | 2 | 420 | 73 | 14 | 6 | 4 | 2 | Tr. | 99 | 74 |
| 7(A) | 10 | 25 | 0.25 V | 0.5 | 0 | 30 | 900 | 2 | 440 | 73 | 12 | 6 | 7 | tr. | 0 | 98 | 75 |
| 8 | 10 | 25 | 0.1 V | 0.25 | 0 | 30 | 900 | 2 | 450 | 78 | 8 | 5 | 5 | 0 | Tr. | 96 | 81 |
| 9(A) | 10 | 13 | 0.07 V | 0.33 | 0 | 20 | 900 | 2 | 450 | 79 | 6 | 4 | 6 | 0 | 0 | 95 | 83 |
| 10 | 10 | 13 | 0.07 Mo | 0.33 | 0 | 20 | 900 | 2 | 450 | 78 | 6 | 3 | 7 | 1 | 1 | 96 | 81 |
| 11 | 10 | 25 | 0.1 Mo | 0.5 | 0 | 30 | 900 | 2 | 460 | 77 | 6 | 4 | 6 | 1 | Tr. | 94 | 82 |
| 12(A) | 10 | 25 | 0.1 W | 0.2 | 0.2 P | 30 | 900 | 2 | 450 | 77 | 7 | 4 | 5 | 0 | Tr. | 93 | 83 |
| 13 | 10 | 10 | 0.03 W | 0.5 | 0.8 B | 20 | 900 | 2 | 440 | 70 | 13 | 7 | 6 | 1 | 0 | 97 | 72 |
| 14 | 10 | 13 | 0.07 V | 0.2 | 0.1 P | 20 | 925 | 2 | 450 | 75 | 8 | 4 | 8 | 0 | 0 | 95 | 79 |
| 15 | 10 | 13 | 0.07 Mo | 0.2 | 0.1 B | 20 | 925 | 2 | 450 | 73 | 9 | 5 | 10 | 0 | 1 | 98 | 75 |
| Comp. Ex.: | | | | | | | | | | | | | | | | | |
| 1 | 10 | 25 | 0 | 0 | 0 | 30 | 900 | 2 | 420 | 65 | 17 | 6 | 5 | 1 | Tr. | 94 | 69 |
| 2 | 10 | 60 | 0 | 0 | 0 | 60 | 850 | 5 | 450 | 66 | 10 | 6 | 8 | 2 | 2 | 94 | 70 |
| 3(A) | 10 | 13 | 0 | 0 | 0 | 20 | 950 | 2 | 440 | 65 | 15 | 8 | 9 | 1 | Tr. | 98 | 66 |
| 4 | 10 | 25 | 0.25 W | 0 | 0 | 30 | 900 | 2 | 460 | 71 | 12 | 7 | 9 | 1 | Tr. | 100 | 71 |
| 5 | 10 | 13 | 0 | 0.33 | 0 | 20 | 900 | 2 | 430 | 69 | 8 | 4 | 8 | 1 | Tr. | 90 | 77 |

NOTE.—AN=Acrylonitrile.  ATN=Acetonitrile.  AL=Acrolein.  tr=trace.

TABLE 2.—AMMOXIDATION OF ISOBUTYLENE

| | Composition of catalyst (atomic ratio) | | | | | | Optimum calcining conditions | | Optimum reaction temp. (°C.) | Conversion of isobutylene to— (percent) | | | | | Total conversion (percent) | Selectivity (percent) |
|---|---|---|---|---|---|---|---|---|---|---|---|---|---|---|---|---|
| | Fe | Sb | Me | Te | X | Si | Temp. (°C.) | Time (hrs.) | | MAN | CO₂ | CO | HCN | MAL | | |
| Ex. No.: | | | | | | | | | | | | | | | | |
| 1(B) | 10 | 25 | 0.25 W | 1.0 | 0 | 30 | 900 | 2 | 400 | 70 | 14 | 7 | 6 | Tr. | 97 | 72 |
| 2 | 10 | 25 | 0.1 W | 0.5 | 0 | 30 | 900 | 2 | 410 | 69 | 16 | 6 | 5 | Tr. | 96 | 72 |
| 3 | 10 | 60 | 0.6 W | 0.2 | 0 | 60 | 900 | 2 | 410 | 67 | 14 | 6 | 7 | Tr. | 94 | 72 |
| 6(B) | 10 | 10 | 0.03 W | 2.5 | 0 | 20 | 925 | 2 | 420 | 66 | 19 | 7 | 5 | Rr. | 97 | 68 |
| 12(B) | 10 | 25 | 0.1 W | 1.0 | 0.2 P | 30 | 900 | 2 | 400 | 69 | 17 | 7 | 5 | Tr. | 98 | 70 |
| 7(B) | 10 | 25 | 0.25 V | 0.5 | 0 | 30 | 925 | 2 | 410 | 66 | 19 | 6 | 7 | Tr. | 98 | 67 |
| 9(B) | 10 | 13 | 0.07 V | 0.33 | 0 | 20 | 925 | 2 | 410 | 67 | 18 | 5 | 6 | Tr. | 96 | 70 |
| 11 | 10 | 25 | 0.1 Mo | 0.5 | 0 | 30 | 900 | 2 | 400 | 68 | 17 | 6 | 1 | 1 | 98 | 69 |
| Comp. Ex.: | | | | | | | | | | | | | | | | |
| 1 | 10 | 25 | 0 | 0 | 0 | 30 | 900 | 2 | 390 | 53 | 24 | 8 | 8 | 2 | 95 | 56 |
| 2 | 10 | 60 | 0 | 0 | 0 | 60 | 850 | 5 | 410 | 51 | 23 | 7 | 8 | 3 | 91 | 56 |
| 3(B) | 10 | 13 | 0 | 0 | 0 | 20 | 925 | 2 | 410 | 52 | 28 | 8 | 6 | 2 | 96 | 54 |
| 6(A) | 10 | 25 | 1.5 | 0 | 0 | 30 | 900 | 2 | 410 | 49 | 31 | 9 | 8 | 1 | 98 | 50 |

NOTE.—MAN=Methacrylonitrile.  MAL=Methacrolein.  tr.=trace.

TABLE 3.—OXIDATION OF PROPYLENE

| | Composition of catalyst (atomic ratio) | | | | | | Optimum calcining conditions | | Optimum reaction temp. (°C.) | Conversion of propylene to— (percent) | | | | | Total conversion (percent) | Selectivity (percent) |
|---|---|---|---|---|---|---|---|---|---|---|---|---|---|---|---|---|
| | Fe | Sb | Me | Te | X | Si | Temp. (°C.) | Time (hrs.) | | AL | CO₂ | CO | AA | —CHO | | |
| Ex. No.: | | | | | | | | | | | | | | | | |
| 1(B) | 10 | 25 | 0.25 W | 1.0 | 0 | 30 | 900 | 2 | 450 | 70 | 10 | 6 | 2 | 1 | 90 | 77 |
| 2 | 10 | 25 | 0.1 W | 0.5 | 0 | 30 | 900 | 2 | 460 | 69 | 10 | 7 | 2 | 2 | 90 | 77 |
| 3 | 10 | 60 | 0.6 W | 0.2 | 0 | 60 | 900 | 2 | 450 | 67 | 12 | 7 | 1 | 2 | 89 | 75 |
| 6(B) | 10 | 10 | 0.03 W | 2.5 | 0 | 20 | 925 | 2 | 460 | 65 | 16 | 8 | 1 | 2 | 92 | 71 |
| 12(B) | 10 | 25 | 0.1 W | 1.0 | 0.2 P | 30 | 900 | 2 | 450 | 69 | 11 | 7 | 2 | 2 | 91 | 76 |
| 7(B) | 10 | 25 | 0.25 V | 0.5 | 0 | 30 | 925 | 2 | 450 | 66 | 14 | 8 | 1 | 2 | 91 | 73 |
| 9(B) | 10 | 13 | 0.07 V | 0.33 | 0 | 20 | 925 | 2 | 460 | 67 | 13 | 6 | 2 | 2 | 90 | 74 |
| 11 | 10 | 25 | 0.1 Mo | 0.5 | 0 | 30 | 900 | 2 | 460 | 70 | 12 | 6 | 2 | 1 | 91 | 71 |
| 16 | 10 | 25 | 0.5 W | 1.0 | 0 | 30 | 900 | 2 | 450 | 72 | 13 | 7 | 2 | 1 | 95 | 76 |
| Comp. Ex.: | | | | | | | | | | | | | | | | |
| 1 | 10 | 25 | 0 | 0 | 0 | 30 | 900 | 2 | 470 | 33 | 38 | 12 | 1 | 4 | 87 | 38 |
| 2 | 10 | 60 | 0 | 0 | 0 | 60 | 850 | 5 | 460 | 38 | 33 | 12 | 1 | 3 | 86 | 44 |
| 3 | 10 | 13 | 0 | 0 | 0 | 20 | 950 | 2 | 470 | 40 | 34 | 12 | 1 | 3 | 90 | 44 |
| 6(B) | 10 | 25 | 1.5 W | 0 | 0 | 30 | 925 | 2 | 460 | 43 | 32 | 12 | 1 | 3 | 91 | 47 |

NOTE.—AL=Acrolein.  AA=Acrylic acid.  —CHO=Lower aldehydes.

TABLE 4.—OXIDATION OF ISOBUTYLENE

| | Composition of catalyst (atomic ratio) | | | | | | Optimum calcining conditions | | Optimum reaction temp. (°C.) | Conversion of isobutylene to—(percent) | | | | | Total conversion (percent) | Selectivity (percent) |
|---|---|---|---|---|---|---|---|---|---|---|---|---|---|---|---|---|
| | Fe | Sb | Me | | Te | X | Si | Temp. (°C.) | Time (hrs.) | | MAL | $CO_2$ | CO | MAA | —CHO | | |
| Ex. No.: | | | | | | | | | | | | | | | | | |
| 1(B) | 10 | 25 | 0.25 | W | 1.0 | 0 | 30 | 900 | 2 | 390 | 58 | 25 | 10 | 2 | 2 | 97 | 60 |
| 2 | 10 | 25 | 0.1 | W | 0.5 | 0 | 30 | 900 | 2 | 380 | 56 | 22 | 10 | 2 | 3 | 93 | 60 |
| 3 | 10 | 60 | 0.6 | W | 0.2 | 0 | 60 | 900 | 2 | 400 | 51 | 26 | 11 | 1 | 3 | 92 | 55 |
| 6(B) | 10 | 10 | 0.03 | W | 2.5 | 0 | 20 | 925 | 2 | 410 | 54 | 27 | 11 | 2 | 2 | 96 | 56 |
| 12(B) | 10 | 25 | 0.1 | W | 1.0 | 0.2 P | 30 | 900 | 2 | 400 | 55 | 26 | 11 | 2 | 3 | 97 | 57 |
| 7(B) | 10 | 25 | 0.25 | V | 0.5 | 0 | 30 | 925 | 2 | 390 | 53 | 26 | 11 | 2 | 3 | 95 | 56 |
| 9(B) | 10 | 13 | 0.07 | V | 0.33 | 0 | 20 | 925 | 2 | 410 | 54 | 26 | 12 | 1 | 2 | 95 | 57 |
| 11 | 10 | 25 | 0.1 | Mo | 0.5 | 0 | 30 | 900 | 2 | 400 | 56 | 24 | 12 | 2 | 2 | 96 | 58 |
| Comp. Ex.: | | | | | | | | | | | | | | | | | |
| 1 | 10 | 25 | 0 | | 0 | 0 | 30 | 900 | 2 | 410 | 26 | 46 | 16 | 1 | 4 | 93 | 28 |
| 2 | 10 | 60 | 0 | | 0 | 0 | 60 | 850 | 5 | 410 | 30 | 41 | 13 | 1 | 3 | 88 | 34 |
| 3 | 10 | 13 | 0 | | 0 | 0 | 20 | 950 | 2 | 410 | 31 | 43 | 15 | 1 | 3 | 93 | 33 |
| 6(B) | 10 | 25 | 1.5 | W | 0 | 0 | 30 | 925 | 2 | 410 | 33 | 40 | 14 | 1 | 3 | 91 | 36 |

NOTE.—MAL = Methacrolein. MAA = Methacrylic acid. —CHO = Lower aldehydes.

TABLE 5.—OXIDATIVE DEHYDROGENATION OF 1-BUTENE

| | Composition of catalyst (atomic ratio) | | | | | | | Optimum calcining conditions | | Optimum reaction temp. (°C.) | Total conversion (percent) | Conversion to butadiene (percent) | Butadiene selectivity (percent) |
|---|---|---|---|---|---|---|---|---|---|---|---|---|---|
| | Fe | Sb | Me | | Te | X | Si | Temp. (°C.) | Time (hrs.) | | | | |
| Example Number: | | | | | | | | | | | | | |
| 1(B) | 10 | 25 | 0.25 | W | 1.0 | 0 | 30 | 900 | 2 | 370 | 90 | 82 | 91 |
| 2 | 10 | 25 | 0.1 | W | 0.5 | 0 | 30 | 900 | 2 | 380 | 91 | 82 | 90 |
| 3 | 10 | 60 | 0.6 | W | 0.2 | 0 | 60 | 900 | 2 | 370 | 89 | 78 | 88 |
| 6(B) | 10 | 10 | 0.03 | W | 2.5 | 0 | 20 | 925 | 2 | 390 | 91 | 80 | 88 |
| 12(B) | 10 | 25 | 0.1 | W | 1.0 | 0.2 P | 30 | 900 | 2 | 380 | 91 | 82 | 90 |
| 7(B) | 10 | 25 | 0.25 | V | 0.5 | 0 | 30 | 925 | 2 | 380 | 90 | 80 | 89 |
| 9(B) | 10 | 13 | 0.07 | V | 0.33 | 0 | 20 | 925 | 2 | 390 | 93 | 81 | 87 |
| 11 | 10 | 25 | 0.1 | Mo | 0.5 | 0 | 30 | 900 | 2 | 370 | 90 | 80 | 89 |
| Comparative Example: | | | | | | | | | | | | | |
| 1 | 10 | 25 | 0 | | 0 | 0 | 30 | 900 | 2 | 420 | 91 | 73 | 80 |
| 2 | 10 | 60 | 0 | | 0 | 0 | 60 | 850 | 5 | 420 | 90 | 72 | 80 |
| 3 | 10 | 13 | 0 | | 0 | 0 | 20 | 950 | 2 | 430 | 92 | 73 | 79 |
| 6 | 10 | 25 | 1.5 | W | 0 | 0 | 30 | 900 | 2 | 430 | 91 | 70 | 77 |

TABLE 6.—OXIDATIVE DEHYDROGENATION OF BUTENE-2

| | Composition of catalyst (atomic ratio) | | | | | | | Optimum calcining conditions | | Optimum reaction temp. (°C.) | Total conversion (percent) | Conversion to butadiene (percent) | Butadiene selectivity (percent) |
|---|---|---|---|---|---|---|---|---|---|---|---|---|---|
| | Fe | Sb | Me | | Te | X | Si | Temp. (°C.) | Time (hrs.) | | | | |
| Example Number: | | | | | | | | | | | | | |
| 2 | 10 | 25 | 0.1 | W | 0.5 | 0 | 30 | 900 | 2 | 420 | 70 | 54 | 77 |
| 6(B) | 10 | 10 | 0.03 | W | 2.5 | 0 | 20 | 925 | 2 | 410 | 71 | 52 | 73 |
| 12(B) | 10 | 25 | 0.1 | W | 1.0 | 0.2 | 30 | 900 | 2 | 410 | 69 | 52 | 75 |
| 7(B) | 10 | 25 | 0.25 | V | 0.5 | 0 | 30 | 925 | 2 | 420 | 71 | 53 | 75 |
| 11 | 10 | 25 | 0.1 | Mo | 0.5 | 0 | 30 | 900 | 2 | 410 | 71 | 56 | 79 |
| Comparative Example: | | | | | | | | | | | | | |
| 1 | 10 | 25 | 0 | | 0 | 0 | 30 | 900 | 2 | 450 | 69 | 46 | 67 |
| 6(A) | 10 | 25 | 1.5 | W | 0 | 0 | 30 | 900 | 2 | 450 | 68 | 45 | 66 |

TABLE 7.—OXIDATIVE DEHYDROGENATION OF MIXED BUTENES

| | Composition of catalyst (atomic ratio) | | | | | | | Optimum calcining conditions | | Optimum reaction temp. (°C.) | Total conversion (percent) | Conversion to butadiene (percent) | Butadiene selectivity (percent) |
|---|---|---|---|---|---|---|---|---|---|---|---|---|---|
| | Fe | Sb | Me | | Te | X | Si | Temp. (°C.) | Time (hrs.) | | | | |
| Example Number: | | | | | | | | | | | | | |
| 3 | 10 | 60 | 0.6 | W | 0.2 | 0 | 60 | 900 | 2 | 410 | 75 | 63 | 84 |
| 9(B) | 10 | 13 | 0.07 | V | 0.33 | 0 | 20 | 925 | 2 | 410 | 75 | 62 | 83 |
| 11 | 10 | 25 | 0.1 | Mo | 0.5 | 0 | 30 | 900 | 2 | 410 | 76 | 62 | 82 |
| Comparative Example: | | | | | | | | | | | | | |
| 2 | 10 | 60 | 0 | | 0 | 0 | 60 | 850 | 5 | 440 | 75 | 55 | 73 |
| 6(A) | 10 | 25 | 1.5 | W | 0 | 0 | 30 | 900 | 2 | 440 | 75 | 54 | 72 |

What we claim is

1. A multiple promoted iron oxide-antimony oxide catalyst composition suitable for use as a catalyst for an oxidation reaction selected from the group consisting of ammoxidation of olefins to the corresponding unsaturated nitriles, oxidation of olefins to the corresponding unsaturated aldehydes, and oxidative dehydrogenation of olefins having four–eight carbon atoms to the corresponding diolefins, said catalyst composition having the empirical formula:

$$Fe_a Sb_b Me_c Te_d X_e O_f$$

wherein Me represents an element selected from the group consisting of vanadium, molybdenum and tungsten; X represents an element selected from the group consisting of phosphorus and boron; and $a$, $b$, $c$, $d$, $e$, and $f$ represent atomic ratios and $a = 10$ $b = 5 - 60$
$c = 0.01 - 1$
$d = 0.05 - 5$
$e = 0 - 1$
$f = 22 - 151$ and is the maximum possible for the emperical formula, said compositions having been activated by heating at a temperature in the range of from 700° to 1,100° C.

2. The multiple promoted catalyst composition according to claim 1 wherein said catalyst composition is supported by a silica carrier, and the carrier is present in 10 to 90 percent by weight of the entire catalyst consisting of the catalyst composition and the carrier.

3. The multiple promoted catalyst composition according to claim 1, subjected to heat treatment at a temperature in the range of from 200° to 600° C. for 2 to 24 hours prior to said calcination at a temperature in the range of from 700° to 1,100° C.